April 12, 1955 G. L. TURNER ET AL 2,706,062
INDUSTRIAL TRUCK
Filed Nov. 4, 1950 4 Sheets-Sheet 1
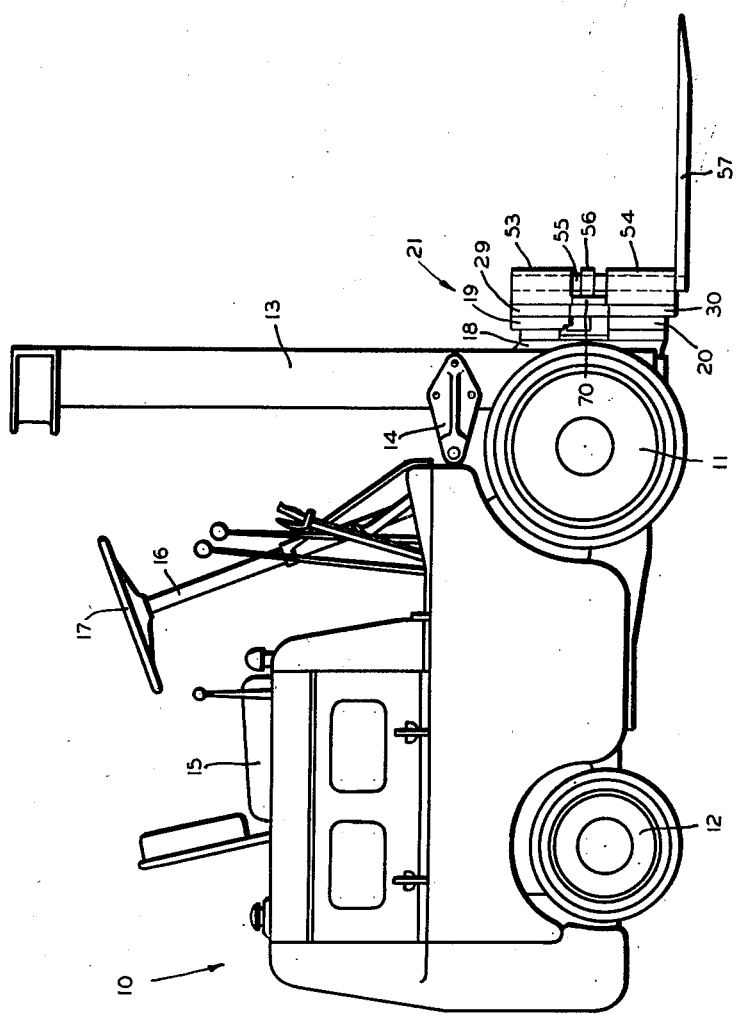
INVENTORS.
GEORGE L. TURNER
MORRIS R. ELLIOTT
BY
ATTYS.

April 12, 1955    G. L. TURNER ET AL    2,706,062
INDUSTRIAL TRUCK
Filed Nov. 4, 1950    4 Sheets-Sheet 2

INVENTORS.
GEORGE L. TURNER
MORRIS R. ELLIOTT
BY
ATTYS.

April 12, 1955  G. L. TURNER ET AL  2,706,062
INDUSTRIAL TRUCK
Filed Nov. 4, 1950  4 Sheets-Sheet 3

INVENTORS.
GEORGE L. TURNER
MORRIS R. ELLIOTT
BY
ATTYS.

April 12, 1955  G. L. TURNER ET AL  2,706,062
INDUSTRIAL TRUCK
Filed Nov. 4, 1950  4 Sheets-Sheet 4

INVENTORS.
GEORGE L. TURNER
MORRIS R. ELLIOTT
BY
ATTYS.

United States Patent Office 2,706,062
Patented Apr. 12, 1955

2,706,062

INDUSTRIAL TRUCK

George L. Turner and Morris R. Elliott, Buchanan, Mich., assignors to Clark Equipment Company, Buchanan, Mich., a corporation of Michigan Application November 4, 1950, Serial No. 194,146

10 Claims. (Cl. 214—730)

Our invention relates generally to an industrial truck and, more specifically, is directed to load supporting means for an industrial truck, of a character, enabling manipulation of the truck in confined areas.

At the present time, in order to handle material with industrial trucks in warehouses, storage yards, and the like, it is necessary to maintain the width of aisles in excess of the overall length of the industrial truck and load supporting means therefor. This width must be maintained since in picking up a pallet supported load with the truck it is necessary to position the latter substantially in a straight line, with respect to the pallet in the row, before inserting the forks under the pallet. Similarly, when removing the load supporting forks from beneath a pallet supported load which has been deposited adjacent one side of the aisle, the truck must be backed away substantially in a straight line before initiating turning in order to enable the ends of the forks to clear the edges of the pallet. Obviously, from a cost standpoint, it is highly desirable to reduce the width of aisles to a minimum in order to thereby increase usable storage space.

It is an object of our present invention to provide load supporting means for an industrial truck, of a character, which is adapted to engage and deposit pallet supported loads adjacent one side of the industrial truck.

It is a feature of our invention that the width of aisles in storage areas may be reduced to substantially the width of an industrial truck.

In order to accomplish the aforementioned object, we contemplate the provision of a first pair of transversely extending plate members adapted to be secured to the load supporting carriage of an industrial truck, with a second pair of plate members adapted to be pivotally mounted to the first pair of plate members about a vertical axis, adjacent one side thereof.

We further contemplate, in the preferred form of our invention, the provision of horizontally extending load supporting fork frames, pivotally mounted adjacent their heels to the second pair of plate members for permitting pivotal movement of the forks with respect to the latter. In the specific embodiment of our invention described, we obtain a compound pivotal movement of the load supporting forks relative to the truck. That is, the second pair of plate members may be pivoted relative to the first pair of plate members, and the load supporting forks may be pivoted relative to the second pair of plate members.

An industrial truck, to which the load supporting means of our present invention has been incorporated, may be maintained parallel to the lengthwise axis of the aisle when a load is engaged or deposited by the load supporting forks adjacent one side of the aisle. Thus, valuable time which was formerly consumed in maneuvering the truck crosswise of the aisle into alignment with the pallet supported load to be picked up is eliminated. It should further be noted that the operation of engaging and depositing a pallet supported load adjacent one side of an aisle is rendered comparatively safer than has heretofore been possible. That is, prior to our invention, when the industrial truck was being aligned with the pallet supported load, crosswise of the aisle, there was the ever present hazard that the operator of the truck, while maneuvering the latter, would inadvertently back up the truck into pallet supported loads adjacent the opposite side of the aisle from which a pallet supported load was being picked up or deposited. With the provision of the load supporting means of our present invention, such hazards are entirely eliminated since the industrial truck need be driven only forwardly or rearwardly within an aisle.

It is a further object of our present invention to provide load supporting means, of the character described, which is of simple construction and yet efficient in operation, and a construction which is economical to manufacture.

Now, in order to acquaint those skilled in the art with the manner of constructing and using devices in accordance with the principles of our present invention, we shall describe, in connection with the accompanying drawings, a preferred embodiment of our invention.

In the drawings:

Figure 1 is a side elevational view of an industrial truck to which the device of our present invention has been incorporated.

Figure 4:
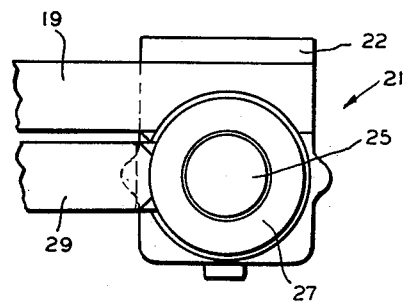
Figure 4 is a partial plan view of the device of Figure 2.
Figure 5:
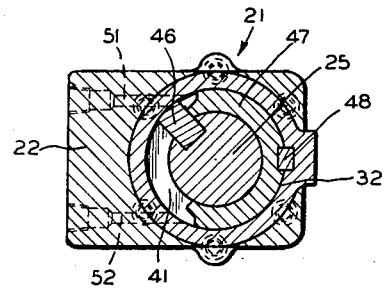
Figure 5 is a horizontal sectional view taken along the line 5—5 of Figure 3.
Figure 2:
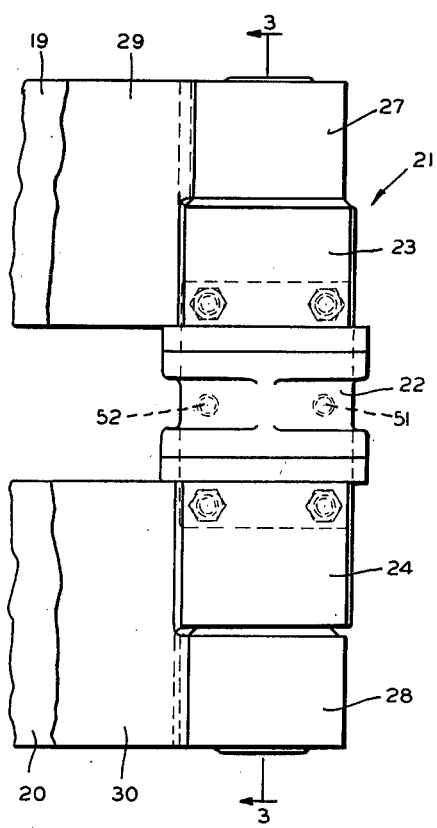
Figure 2 is a partial front elevational view of the device of our present invention.

Referring now in detail to the drawings, there is shown an industrial lift truck, indicated generally by the reference numeral 10, having driving wheels 11 at the forward end thereof and steering wheels 12 at the rear end thereof. The truck, adjacent its forward end, is provided with a vertical mast 13 pivotally mounted for limited fore and aft movement. The mast 13 has suitable connection, through bracket means 14, to a hydraulically controlled piston and cylinder assembly (not shown) which is provided for controlling the tilting movement of the mast 13.

The truck 10 is provided with a driver's seat 15, which is disposed adjacent the steering column 16 operatively connected to the rear steering wheels 12. A conventional hand steering wheel 17 is mounted at the upper end of the column 16 and is adapted to be manipulated by the operator of the truck 10. The truck 10 is provided with a power plant, such as an internal combustion engine, having pump means associated therewith for developing fluid under presure which is used for raising and lowering a load supporting and elevating carriage 18, guided for vertical movement within the mast 13. Fluid under pressure is also used for tilting the mast 13 in a known manner, and for actuating the device of our present invention in a manner to be described hereinafter.

Referring now to Figures 2 through 5, there is shown the details of construction of the device of our present invention. A pair of transversely extending vertically spaced plate members 19 and 20 are adapted to be secured, in a conventional manner, to the load supporting carriage 18. Mounted adjacent one end of the plate members 19 and 20 is an assembly, indicated generally by the reference numeral 21, which is provided for rotating the load supporting means of the industrial truck about a vertical axis. The assembly 21 comprises a T-shaped housing member 22 which is adapted to be mounted between the plate members 19 and 20, with the vertical legs being disposed behind the plate members 19 and 20 and with the body portion extending forwardly therefrom. A vertical opening 32 is formed in the housing member 22, forwardly of the plate members 19 and 20. The upper and lower surfaces of the housing member 22 are recessed to receive horizontal plate members 42 and 43, which plate members 42 and 43 have openings formed therein aligned coaxially with opening 32 in the housing member 22. Disposed immediately above and below the plate members 42 and 43 are vertically extending sleeve members 23 and 24 which are aligned coaxially with the opening 32.

A vertically extending post member 25 is disposed through the sleeve members 23 and 24, the openings in the plate members 42 and 43, and the opening 32 in the housing member 22. Suitable needle bearings 26 are disposed between the outer periphery of the post member 25 and the inner peripheries of the sleeve members 23 and 24 for rotatably mounting the post member 25. A pair of collar members 27 and 28 are, respectively, nonrotatably secured to the upper and lower ends of the post member 25. Suitably secured, respectively, to the collar members 27 and 28 are plate members 29 and 30, which extend radially therefrom. A suitable thrust ball bearing assembly 31 is interposed between the upper collar member 27 and the sleeve member 23.

A suitable semicylindrical sleeve member or C-shaped member 47 is disposed about the post member 25 within the opening 32 in the housing member 22, and the member 47 is suitably keyed as at 48 to the housing member 22. A fluid chamber 41 is thus formed in the opening 32 between the ends of the member 47 for a purpose to be fully described hereinafter. Suitable bearing ring members 49 and 50 are disposed at the upper and lower ends of the member 47, in juxtaposition of the plate members 42 and 43. To prevent fluid leakage from the fluid chamber 41, suitable seal rings 44 and 45 are interposed between the outer periphery of the post member 25 and the plate members 42 and 43.

A vertical rectangular vane member 46 is disposed within the chamber 41 and is fixed in the post member 25 so as to extend radially therefrom. The vane member 46 at its outer edge frictionally engages the inner wall of opening 32.

Suitable fluid passageways 51 and 52 are formed in the housing member 22. The one ends of the fluid passageways 51 and 52 communicate with the fluid chamber 41, adjacent each side thereof, and the passageways 51 and 52 at their other ends are suitably threaded to receive the threaded ends of fluid hoses (not shown). The fluid hoses have suitable connection through conventional valve means (not shown) to the fluid pressure developing means of the industrial truck 10.

Fluid may be selectively admitted to either of the fluid passageways 51 and 52 by suitable manipulation of the valve means by the operator of the truck. When fluid under pressure is admitted through the fluid passageway 52 into one side of the chamber 41, the vane member 46 is rotated clockwise to the position shown in Figure 3. It will be noted that the one edge of the member 47 acts as a stop member for the vane member 46, thereby limiting rotational movement of the latter.

Figure 3:
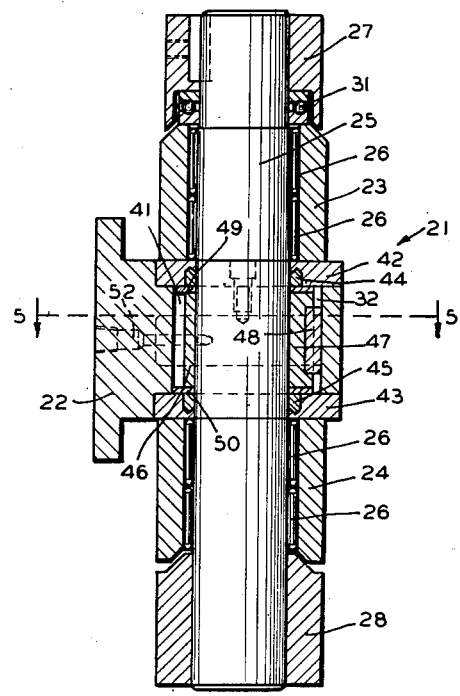
Figure 3 is a vertical sectional view taken along the line 3—3 of Figure 2.

When fluid is bled from the fluid passageway 52 and fluid is admitted through the fluid passageway 51 into the other side of chamber 41, the vane 46 is caused to rotate counterclockwise from the position shown in Figure 3, until the vane member 46 contacts the other edge of the member 47 which limits rotational movement of the vane 46 in this direction. It should be understood that by varying the cylindrical extent of the member 47, the extent of rotational movement of the vane member 46 may be varied. In the specific embodiment shown, the vane member 46 is adapted to be rotated through slightly more than ninety degrees.

As aforedescribed, the vane member 46 is secured to the post member 25, and therefore, when the former is caused to be rotated by the selective admission of fluid under pressure to the chamber 41, the post member 25, together with the plate members 29 and 30, are caused to be rotated therewith.

A pair of horizontally extending load supporting fork frames 57 are mounted to the plate members 29 and 30, adjacent each side thereof. Since the mounting of each fork frame is identical, the mounting of only one of the fork frames will be described in detail.

As best shown in Figure 1, a pair of sleeve members 53 and 54 are secured, respectively, to the plate members 29 and 30. The axes of the sleeve members 53 and 54 are aligned in a vertical direction, and rotatably mounted therein is a shaft member 55. Disposed about the shaft 55, intermediate of the sleeve members 53 and 54, is a rotating mechanism, indicated generally by the reference numeral 56, which is provided for effecting rotation of the shaft 55 with respect to the sleeve members 53 and 54. The rotating mechanism 56 is carried by a bracket member 70, secured at its ends to the sleeve members 53 and 54. The rotating mechanism 56 may be similar in construction to the aforedescribed rotating mechanism 21. However, it will be understood that any suitable rotating means may be utilized. Secured to the lower end of the shaft 55 is the one end of a forwardly extending load supporting fork frame 57.

Each of the shafts 55, which are provided for supporting the load supporting fork frames 57, may be rotated separately by a suitable rotating mechanism 56 or only one of the shafts 55 need be provided with a rotating mechanism 56 if the other is suitably connected thereto as through a tie rod 58. Since the mechanism for rotating the fork frames forms no part of our present invention, it is believed that a more detailed description thereof is unnecessary. For a further description of various forms of rotating mechanisms for pivoting load supporting forks, reference may be had to the copending application of George L. Turner and Robert Lapsley, Serial No. 100,684, filed June 22, 1949, now Patent No. 2,643,784.

From the foregoing description, it will be seen that the plate members 29 and 30, together with the fork frames 57, can be rotated relative to the plate members 19 and 20, and that the fork frames can, in addition, be pivoted relative to the plate members 29 and 30. A compound pivotal movement of the load supporting forks 57 relative to the truck is thus obtained.

Referring now to Figures 6 through 10, we shall describe how a load may be engaged by an industrial truck to which the device of our present invention is incorporated.

Figure 6:
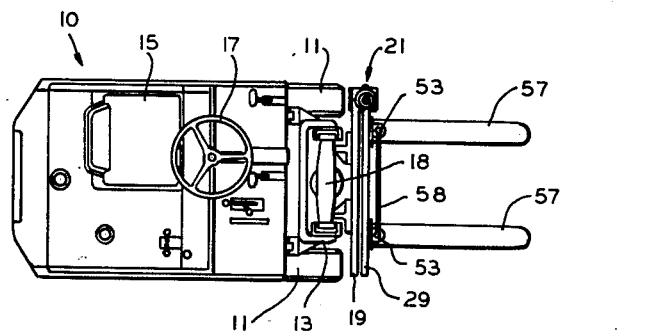
Figures 6 through 10 are plan views of the truck of Figure 1, showing the device of our present invention in progressive positions assumed while engaging a pallet supported load.
Figure 7:
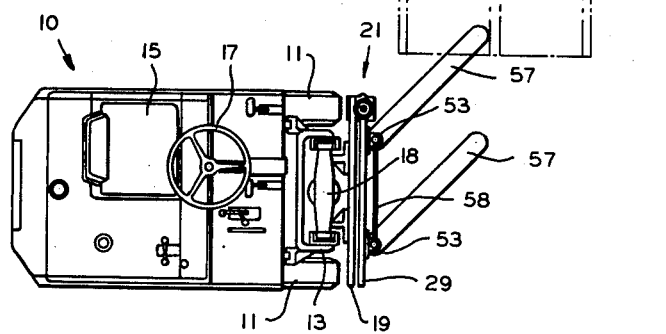

When it is desired to pick up a pallet supported load, the truck 10 is driven down the aisle, adjacent to which the load to be engaged is deposited, with the plate members 29 and 30, and the forwardly projecting load supporting fork frames 57, in the position shown in Figure 6. The truck 10 is then stopped with the forward end adjacent one corner of the load to be picked up. The operator then effects rotation of the shafts 55, through the rotating mechanism 56, which effects pivotal movement of the load supporting fork frames 57 toward the pallet supported load 60 to be picked up, as shown in Figure 7. After the fork frames 57 have been pivoted initially, the operator admits fluid under pressure, through the fluid passageway 51, to the fluid chamber 41, thereby causing the vane member 46, together with the post member 25 and plate members 29 and 30, to rotate counterclockwise, to the position shown in Figure 8. As the plate members 29 and 30 are further rotated from the position shown in Figure 8 toward the position shown in Figure 9, the shafts 55 are simultaneously rotated clockwise. After the plate members 29 and 30, and the fork frames 57, have been disposed in the position shown in Figure 9, the load supporting carriage 18 is raised in the mast 13, thereby causing the pallet 60, together with the load thereon, to be raised from the ground.

Figure 9:
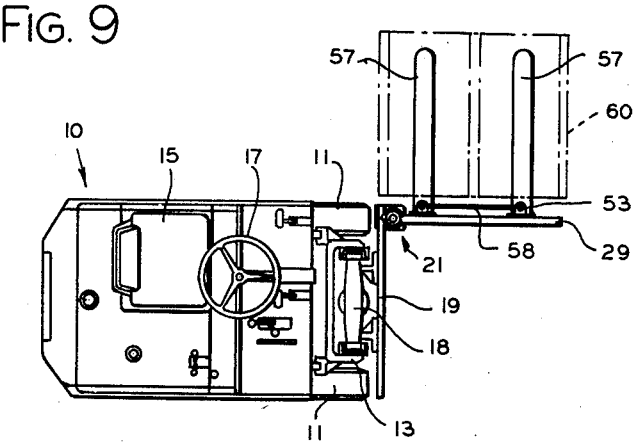
Figure 10:
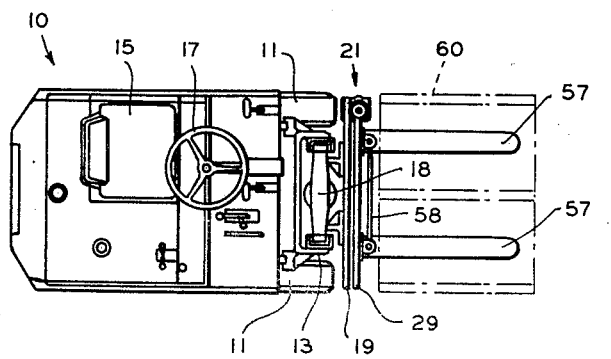

The operator then admits fluid under pressure to the fluid passageway 52 while bleeding fluid from the fluid passageway 51, thereby causing the vane member 46, together with the post member 25 and the plate members 29 and 30, to rotate clockwise from the position shown in Figure 9 to the position shown in Figure 10. When the load has been disposed in the position shown in Figure 10, the truck may either be driven forwardly or rearwardly in the aisle to the position wherein the pallet supported load is to be deposited.

When it is desired to deposit the pallet supported load, the reverse procedure is followed. That is, after the truck has been driven to the location in which the pallet supported load is to be deposited, the operator of the truck admits fluid under pressure to the fluid passageway 51 while placing the fluid passageway 52 under bleed condition. This causes counterclockwise rotation of the vane member 46, together with post member 25, plate members 29 and 30, and fork frames 57, from the position shown in Figure 10 to the position shown in Figure 9.

Figure 8:
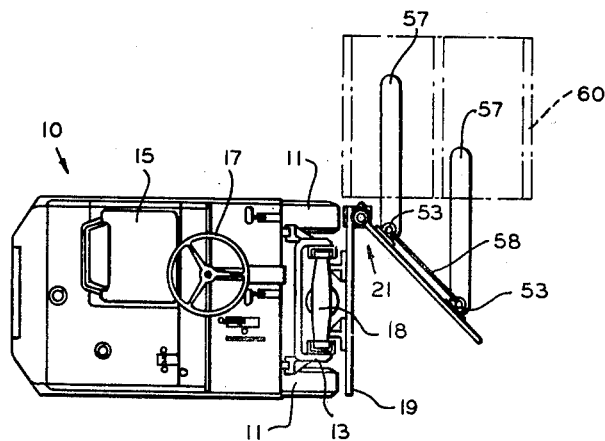

The operator, by manipulating the suitable control lever, then causes the load supporting carriage 18 to be lowered in the mast 13 until the pallet 60 contacts the ground, whereupon fluid is admitted to the fluid passageway 52 while the fluid passageway 51 is bled so as to effect rotation of the plate members 29 and 30 from the position shown in Figure 9 to the position shown in Figure 8. Simultaneously, the fork frames 57 are rotated counterclockwise, with respect to the plate members 29 and 30, from the position shown in Figure 9. Further clockwise rotation of the plate members 29 and 30 causes the latter to be rotated from the position shown in Figure 8 to the position shown in Figure 7, after which the fork frames 57 may be pivoted clockwise from the position shown in Figure 7 to the normal position shown in Figure 6. The truck 10 is then ready to engage another load.

While we have shown and described the rotational movement of the plate members 29 and 30, with respect to the plate members 19 and 20, and the pivotal movement of the fork frames 57, with respect to the plate members 29 and 30, as taking place in separate steps, it will be understood that this is a continuous operation which is short in duration of time.

From the foregoing description, it will be realized that the industrial truck 10 may remain parallel to the lengthwise axis of the aisle when a pallet supported load is being picked up or deposited adjacent the aisle. It will thus be seen that considerable time is saved in picking up and depositing a load, as the operator of the truck need not manipulate the latter crosswise in the aisle as has been heretofore necessary when the fork frames 57 have been rigidly secured to the load supporting carriage so as to extend forwardly therefrom.

While we have described and illustrated herein load supporting means in the form of a pair of horizontally projecting fork frames 57 pivotally mounted adjacent the lower edge of the plate 29 for pivotal movement in a substantially horizontal plane, it will be understood that our invention is not limited to two fork frames. It is possible in some cases to utilize load supporting means comprised of a single load supporting frame 57. Similarly, it is possible, if desired, to utilize three or more frames 57.

While we have shown and described what we believe to be a preferred embodiment of our present invention, it will be understood that various modifications and rearrangements may be made therein without departing from the spirit and scope of our present invention.

We claim:

1. For use with an industrial truck having a load supporting carriage, the combination of vertically extending plate means, means for pivotally mounting said plate means about a substantially vertical axis to the load supporting carriage adjacent one side thereof whereby said plate means may be swung from a position transversely of the truck to a position longitudinally of the truck and vice versa, and horizontally projecting load supporting means pivotally mounted adjacent the lower edge of said plate means for pivotal movement in a substantially horizontal plane.

2. For use with an industrial truck having a load supporting carriage, the combination of vertically extending plate means, means for pivotally mounting said plate means about a vertical axis to the load supporting carriage adjacent one side thereof, and horizontally projecting load supporting fork frames pivotally mounted about vertical axes to said plate means along the lower edge thereof.

3. The combination of claim 2 including means between the load supporting carriage and said plate means for rotating the latter relative to the former.

4. The combination of claim 3 including means carried by said plate means for pivoting said fork frames relative to said plate means.

5. The combination of claim 2 including means carried by said plate means for pivoting said fork frames relative to said plate means.

6. For use with an industrial truck having a load supporting carriage, the combination of vertically extending plate means having a transverse extent substantially equal to the transverse extent of said load supporting carriage when disposed parallel thereto, means for pivotally mounting said plate means adjacent one side thereof about a vertical axis to the load supporting carriage adjacent one side thereof, fluid motor means between the load supporting carriage and said plate means for rotating the latter relative to the former, and load engaging means carried by said plate means.

7. For use with an industrial truck having a load supporting carriage, the combination of motor means adapted to be mounted to the load supporting carriage adjacent one side thereof, said motor means having a vertically extending output shaft, vertically extending plate means fixed to the output shaft of said motor means whereby said plate means can be rotated relative to the load supporting carriage by said motor means from a position transversely of the truck to a position longitudinally of the truck and vice versa, and load engaging means carried by said plate means.

8. The combination of claim 7 wherein said motor means comprises a fluid chamber, a vane member disposed in said fluid chamber and fixed in said output shaft, and means for selectively admitting fluid under pressure to opposite ends of said fluid chamber whereby said vane member and said output shaft may be rotated thereby.

9. The combination of claim 7 wherein said load engaging means comprises horizontally projecting load supporting fork frames pivotally mounted about vertical axes to said plate means along the lower edge thereof.

10. For use with an industrial truck having a load supporting carriage, the combination of motor means adapted to be mounted to the load supporting carriage adjacent one side thereof, said motor means having a vertically extending output shaft, plate means at one end being fixed to the output shaft of said motor means whereby said plate means can be rotated relative to the load supporting carriage, said plate means having a transverse extent substantially equal to the transverse extent of said load supporting carriage when disposed parallel thereto, and load engaging means carried by said plate means.

References Cited in the file of this patent

UNITED STATES PATENTS

| Number | Name | Date |
|---|---|---|
| 815,416 | Garland | Mar. 20, 1906 |
| 1,457,639 | Straight | June 5, 1923 |
| 1,765,765 | Luce | June 24, 1930 |
| 1,884,907 | Stoner | Oct. 25, 1932 |
| 2,271,624 | Cochran | Feb. 3, 1942 |
| 2,298,196 | Cochran | Oct. 6, 1942 |
| 2,410,373 | Westervelt | Oct. 29, 1946 |
| 2,540,569 | Crise | Feb. 6, 1951 |
| 2,563,514 | Brosamer | Aug. 7, 1951 |
| 2,575,552 | Glenn, Jr. | Nov. 20, 1951 |
| 2,605,918 | Roscoe | Aug. 5, 1952 |
| 2,611,498 | Broersma | Sept. 23, 1952 |
| 2,620,930 | Mullgardt | Dec. 9, 1952 |
| 2,621,822 | Melin | Dec. 16, 1952 |